W. M. MARSHALL.
Gilding and Silvering Mica and Glass.
No. 80,754.    Patented Aug. 4, 1868.
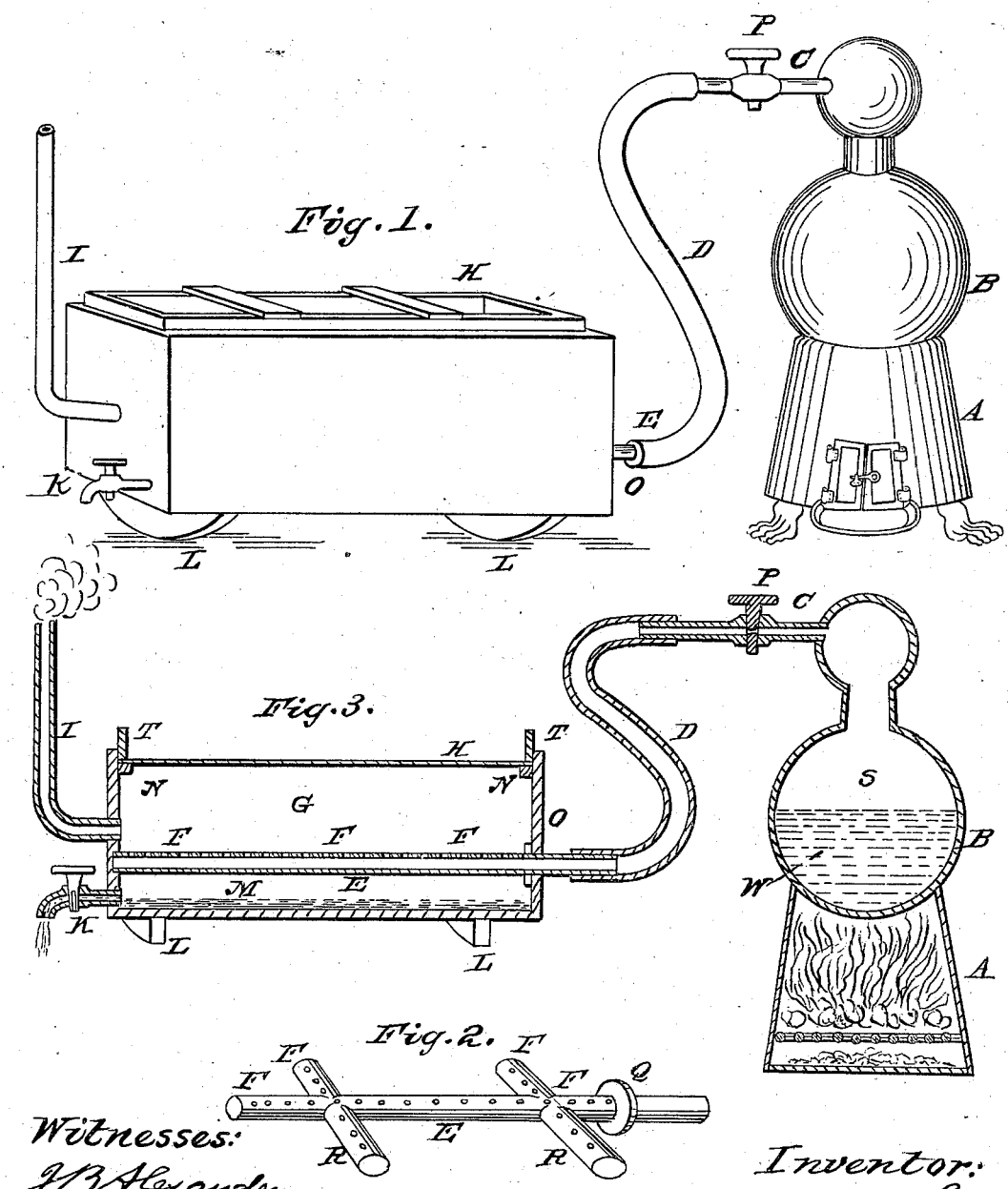

United States Patent Office.

WILLIAM MAROT MARSHALL, OF PHILADELPHIA, PENNSYLVANIA, ASSIGNOR TO HIMSELF AND JOSEPH B. ALEXANDER, OF WASHINGTON, DISTRICT OF COLUMBIA.

*Letters Patent No. 80,754, dated August 4, 1868.*

IMPROVEMENT IN GILDING AND SILVERING MICA AND GLASS.

*The Schedule referred to in these Letters Patent and making part of the same.*

TO ALL WHOM IT MAY CONCERN:

Be it known that I, WILLIAM MAROT MARSHALL, of Philadelphia, in the county of Philadelphia, in the State of Pennsylvania, have invented a new and improved Method of Gilding and Silvering Mica and Glass; and I do hereby declare that the following is a full, clear, and exact description thereof, reference being had to the accompanying drawings, and to the letters of reference marked thereon, making a part of this specification, in which—

Figure 1 represents in perspective a view of the furnace and steam-boiler, and the gilding and silvering-chest on rockers.

Figure 2 represents in perspective a view of the perforated steam-pipe as used in the rocking-chest.

Figure 3 represents a sectional view of the whole machine, as represented in fig. 1.

Similar letters of reference denote like parts where they occur in the several figures, in which—

A is the furnace.
B is the steam-boiler.
C is a metal steam-pipe.
D is a flexible steam-pipe.
E is the perforated steam-pipe.
F are the perforations in E for jets of steam.
G is steam escaping from the perforations F.
H is a plate of glass or India-rubber bottom of pan.
I is the steam-escape pipe.
K is a cock or spigot, to pass off condensed steam.
L are the rockers.
M is the chamber for condensed steam.
N are the supports for the pan or glass plate.
O is the shell of the chest.
P is a stop-cock on steam-pipe C.
Q is a collar on pipe E.
R are transverse arms to pipe E.
S is steam.
T is the pan.
W is boiling water.

The nature of my invention consists in gilding or silvering mica or glass by means of the ordinary chemical solutions of gold and silver, when rocked together in a peculiarly-constructed pan, under the action of moist or steam heat at a low pressure.

To enable others skilled in the art to make and use my invention, I will proceed to describe my method of gilding or silvering mica and glass.

I first arrange for a supply of steam, either by means of a furnace and boiler, shown in figs. 1 and 3 in the drawings, or conducted from a boiler that may be in use for propelling machinery. I then form a steam-chest, O, of wood or metal, in a square or oblong-square shape, being composed of four sides and a bottom, and open at the top. To the bottom of the chest O, I attach rockers L L, and on the inside of the chest I also attach, at a short distance below the upper edge or rim, a ledge, N N, as a support for the plate of glass or the pan T T. This ledge may be covered with India rubber, so as to make a steam-tight joint with the plate of glass or pan.

Within the chest O, I place a perforated steam-pipe, with transverse arms, also perforated, (see E and R R,) so that from the perforations F F F jets of steam may shoot upward against the plate of glass or India-rubber bottom of pan H.

The pipe E and the pipe C are connected by a flexible pipe, D, which will admit of twisting in the motion of rocking the chest.

I also provide the chest O with an escape-pipe, I, to pass off waste steam, and also a cock, at K, to pass off condensed steam from the chamber M.

I then make a pan, T T, consisting of a frame made to fit into the top of the chest O, and to rest on the ledges N N. This frame I make of porcelain, or metal covered or enamelled with porcelain, or covered with India rubber, and to which I put a bottom of thin India rubber, H. This pan is to be used in gilding or silvering of mica, but in the gilding or silvering of glass I do not use the pan, but merely lay the plate of glass in the place of the pan, on the suppports N N, if large enough to fill tight the whole space, or on wooden or metal diaphragm, covered with India rubber, if the glass be smaller in size than the opening at the top of the chest O.

The chemicals I use for silvering are the various well-known solutions of silver, such as nitrate of silver, &c., and for gilding, the cyanuret of gold, or a solution of gold in *aqua regia*. In the use of these solutions, I treat them with a preparation of ammonia and grape-sugar.

All being prepared, if I wish to gild or silver mica, I lay the sheets of it on the bottom of the rubber pan H, so as to leave a small space between each sheet. These spaces, with a small portion of the edge of each sheet of mica, is covered with an India-rubber strip, pressed down with a properly-applied weight, or any other mode of pressure. The pan T T is now put into the top of the chest O. The properly-mixed chemicals are now poured into the pan, so as to well cover all the sheets of mica laid out on the rubber bottom H. The cock P is now turned, and steam let on, which, passing through the pipes C, D, and E, and rushing in fine jets through the perforations F F, strikes the bottom of the pan H, giving a constant moist heat, so necessary to this process. The chest O is kept rocking while the steam is on, either by hand or machinery, and in a few minutes the work is done.

The operation of gilding or silvering glass is exactly the same, with the exception that the pan T T, with its India-rubber bottom H, is not used, but the steam is allowed to jet directly against the opposite side of the glass plate or plates to be operated on.

The glass, when gilded or silvered by this process, may be used for reflectors, mirrors, &c., &c., and the mica prepared in this manner may be used for reflectors, lettering, and other decorations.

I do not claim the chemicals or their solutions as used in this process; nor do I claim the gilding or silvering of mica or glass.

What I do claim as my invention, and desire to secure by Letters Patent, is—

The method of gilding and silvering mica and glass, in the manner and for the purposes substantially as described and set forth.

WM. M. MARSHALL. [L. S.]

Witnesses:
J. B. ALEXANDER,
E. SEYMOUR.